Dec. 9, 1958  H. M. HERBENER  2,863,486
BILLFOLDER

Filed April 25, 1958  6 Sheets-Sheet 1

INVENTOR
Henry M. Herbener
BY B. P. Fishburne, Jr.
ATTORNEY

Dec. 9, 1958　　　　H. M. HERBENER　　　　2,863,486
BILLFOLDER
Filed April 25, 1958　　　　　　　　　　　　6 Sheets-Sheet 2

INVENTOR
Henry M. Herbener.
BY B. P. Fishburne, Jr.
ATTORNEY

Dec. 9, 1958    H. M. HERBENER    2,863,486
BILLFOLDER
Filed April 25, 1958    6 Sheets-Sheet 3

INVENTOR
Henry M. Herbener
BY B. P. Fishburne, Jr.
ATTORNEY

Dec. 9, 1958  H. M. HERBENER  2,863,486
BILLFOLDER
Filed April 25, 1958  6 Sheets-Sheet 4

INVENTOR
Henry M. Herbener.
BY B. P. Fishburne, Jr.
ATTORNEY

Dec. 9, 1958 H. M. HERBENER 2,863,486
BILLFOLDER
Filed April 25, 1958 6 Sheets-Sheet 5

INVENTOR
Henry M. Herbener.
BY B. P. Fishburne, Jr.
ATTORNEY

# United States Patent Office 2,863,486
Patented Dec. 9, 1958

2,863,486

BILLFOLDER

Henry M. Herbener, Thomasville, Ga.

Application April 25, 1958, Serial No. 731,023

15 Claims. (Cl. 150—35)

The present invention relates to billfolders.

A primary object of the invention is to provide a billfolder having a maximum carrying capacity with minimum bulkiness and size.

A further important object of the invention is to provide a billfolder which is substantially free of raw or cut edges, likely to tear, and composed entirely in the finished form of folded and welded edges or margins which are highly resistant to tearing.

Another object of the invention is to provide a billfolder in which various parts subject to the most wear during use are formed of two or more thicknesses of material, to afford a strong and durable construction.

A further object is to provide a billfolder of the abovementioned character which may be constructed from a minimum amount of material, and which, in the finished form, contains no material without a useful purpose.

Another object is to provide a billfolder having a plurality of compartments or pockets and including sides serving as parts of more than one pocket or compartment.

Still another object of the invention is to provide a billfolder adapted to be formed entirely of heat sealable sheet plastics material which is relatively inexpensive, attractive in appearance and extremely tough and durable.

A still further object is to provide a billfolder of the above-mentioned character which is capable of carrying bills, various types of cards, keys and coins, and the like.

A further object is to provide a billfolder having one or more panels and pockets which are transparent.

Other objects and advantages of the invention will become apparent during the course of the following description.

In the accompanying drawings, forming a part of this application, and in which like numerals are employed to designate like parts throughout the same.

In the drawings, wherein for the purpose of illustration are shown preferred embodiments of the invention, attention is directed first to Figures 1 through 24 inclusive, wherein the numeral 1 designates a generally rectangular blank of heat sealable or weldable thermoplastic sheet material, such as vinyl plastic or the like. The sheet plastic material of the blank 1 is of a type adapted to be heat sealed or welded by the use of apparatus such as that shown in United States patent 2,631,646, or by similar means. The blank 1 is provided near its lower right hand corner in Figure 1 with a pair of spaced adjacent rectangular openings 2 and 3, as shown. The opening 2 is spaced somewhat further from the lower longitudinal edge 4 of the blank 1 than the opening 3, and the two rectangular openings are preferably of the same size, as indicated. The upper longitudinal edge 5 of the blank 1 is cut away or notched at 6 and 7 in order to save material in the construction of the billfolder, as will become apparent as the description proceeds. The sheet plastic blank 1 is preferably opaque, and it may be of any desired color.

Figure 2:
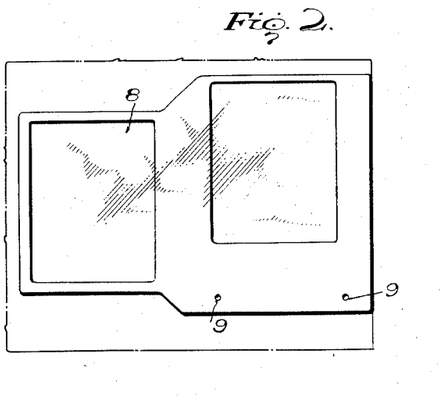
Figure 2 is a plan view of a transparent blank used in conjunction with the blank of Figure 1 for making the billfolder.

The numeral 8 designates a further blank formed of the same material as the blank 1 and being transparent.

Figure 3:
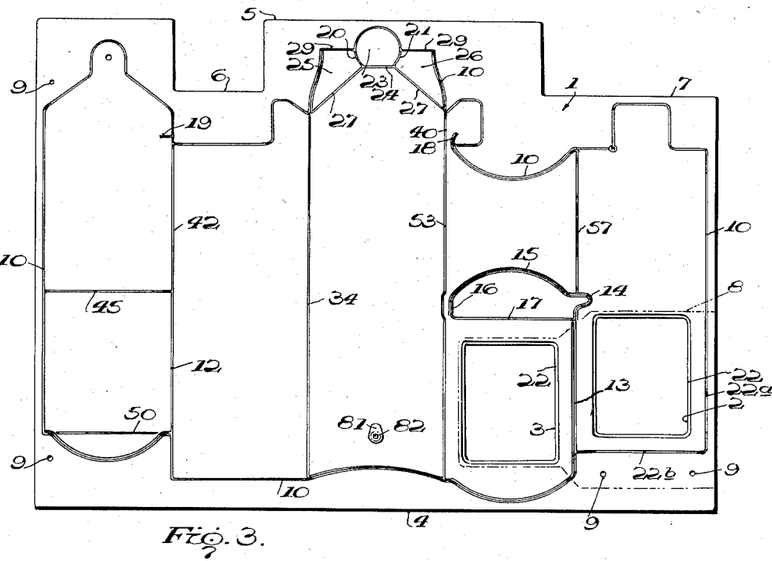
Figure 3 is a further plan view of the blanks shown in Figures 1 and 2 arranged in superposed relation, and showing preliminary welding operations performed upon the blanks.

With reference to Figure 3 of the drawings, the blanks 1 and 8 are shown arranged in superposed relation, with the transparent blank 8 underlying the corner portion of the blank 1 adjacent to the openings 2 and 3. Locating holes 9 are formed in the blanks 1 and 8, as shown in Figure 3, to aid in fixedly positioning the blanks in the welding die apparatus, not shown.

Figure 1:
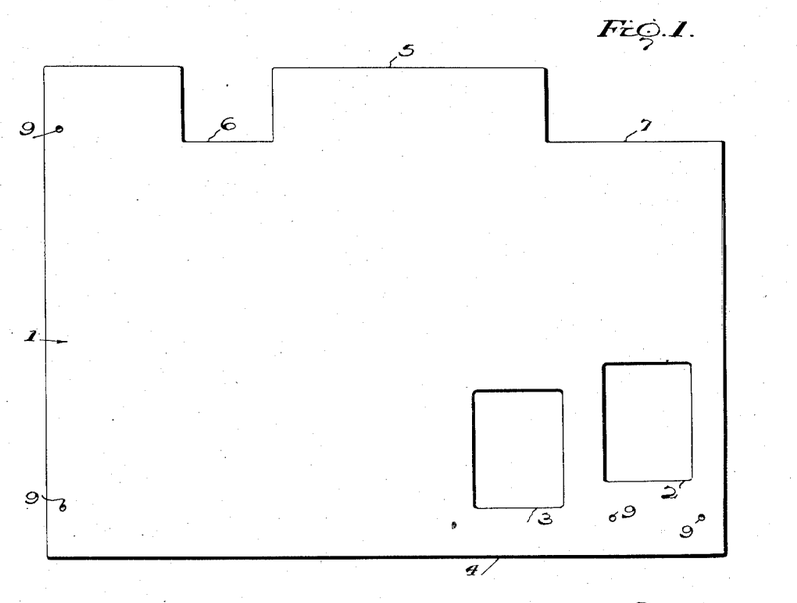
Figure 1 is a plan view of a blank employed in the making of the billfolder of the present invention.

With continued reference to Figure 3, the welding die apparatus now operates upon the superposed blanks 1 and 8 for the dual purposes of heat sealing or welding the two blanks together in assembly, and forming in the blanks various folding lines and also lines which may be severed by tearing. To form the tearing lines, the heated die means weakens the blanks or reduces their thickness along the lines which are to be torn or separated. The fold lines are likewise formed in the blanks at various points by reducing the thickness of the blank, but to a lesser extent that required to produce the tear lines. The tear lines of the blanks 1 and 8 in Figure 3 comprise first the entire margin 10 of the billfolder body configuration shown in Figure 3, to become, after tearing, the billfolder body portion 11 illustrated in Figure 4. In addition to the marginal tear line 10 in Figure 3, a number of other tear lines are formed in the blanks, including the tear lines 12, 13, 14, 15, 16, 17, 18, 19, 20 and 21. All of the remaining lines formed by the welding die means in the blanks of Figure 1 are folding lines. Simultaneous with the formation by the die means of the various tear and folding lines, the transparent blank 8 is heat sealed or welded to the opaque blank 1 around the margins of the rectangular openings 2 and 3, as indicated by the welding lines 22 in Figure 3. The two blanks 1 and 8 are also welded together at this time along the lines of welding 22a and 22b, Figure 3.

Figure 4:
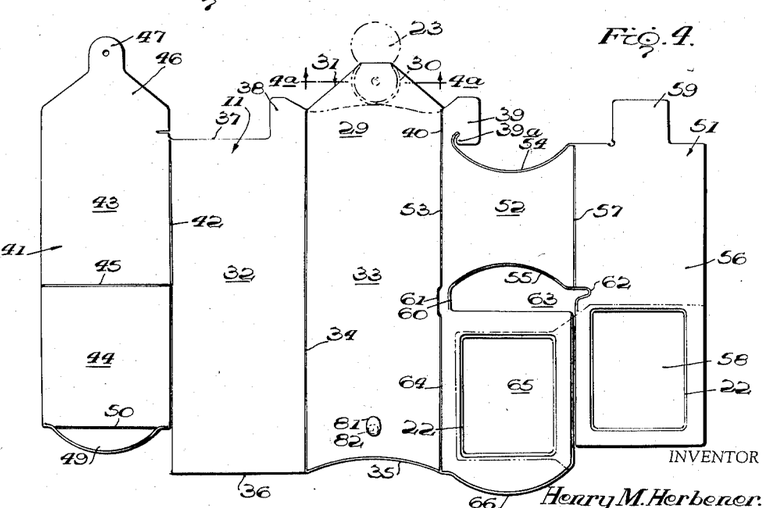
Figure 4 is a plan view of the body portion of the billfolder after excess material has been torn from the superposed blanks shown in Figure 3 and certain sections of the body portion have been separated by tearing, the view also showing an additional welding step performed upon the billfolder.

After completion of the formation of the tear and folding lines as shown in Figure 3, all of the tearing operations upon the blanks are performed, to produce the billfolder body portion 11 shown in Figure 4. The excess marginal waste material of the blank 1 is entirely torn away along the marginal tear line 10, to produce the marginal configuration for the billfolder body portion 11 shown in Figure 4. Likewise, the blank 1 is further torn along the lines 12, 13, 14, 15, 16, 17, 18, 19, 20 and 21 at this time. The material of the blank 1 encompassed by the tear lines 14, 15, 16 and 17, is also discarded. The tearing operation along the line 13 also severs the transparent blank 8 into two sections.

Figure 4A:
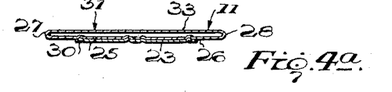
Figure 4a is an enlarged horizontal section taken on line 4a—4a of Figure 4.

With continued reference to Figure 4 and Figure 4a, an additional welding operation on the billfolder body portion 11 is performed at this time. The generally circular tab 23, Figure 3, formed by the marginal tear line 10, tear lines 20 and 21 and the fold line 24, is folded rearwardly or under the body portion 11 in Figure 4, and a companion pair of tabs 25 and 26, also formed during the tearing operation on opposite sides of the tab 23, are folded under the body portion 11 along the diagonal fold lines 27. The pair of tabs 25 and 26 are folded under the body portion 11, prior to the folding under of the tab 23, so that the tab 23 underlies the pair of tabs 25 and 26 in Figure 4. The free ends or edges 29 of the tabs 25 and 26 meet or abut beneath the body portion 11 but do not overlap. The generally circular tab 23 which underlies the tabs 25 and 26 after folding spans the meeting edges 29, as shown in Figures 4 and 4a. The three tabs 23, 25 and 26 are now permanently welded together along the circularly curved line 30 defined by the tab 23, and a metal plate, not shown, is slipped between the body portion 11 and the folded tabs so that the same will not become welded thereto. The welded construction of the three tabs 23, 25 and 26 is further clearly shown in Figure 4a of the drawings. The construction forms upon the billfolder body portion 11 a tapered coin cup 31, as indicated.

With continued reference mainly to Figure 4, the billfolder body portion 11 comprises a pair of central side by side elongated generally rectangular panels 32 and 33, foldable upon the straight fold line 34, transversely of the body portion 11. As shown, the tapered coin cup 31 is carried by one end of the central elongated panel 33. The opposite end of the panel 33 is defined by a cut back curved edge 35. The corresponding end of the panel 32 is defined by a straight edge 36. The opposite end of the panel 32 is notched at 37 to form an integral tongue 38 upon the panel 32 near the inner end of the coin cup 31 at one side of the same. The tongue 38 is also foldable upon the fold line 34. A companion free tongue 39 is integrally secured to the side of the panel 33 remote from the tongue 38, and this tongue 39 is foldable upon a fold line 40, parallel to the fold line 34. The tongue 39 is located near the inner end of the coin cup 31, as shown. A further small tongue 39a is formed upon the tongue 39 by the curved slit afforded by the separated tear line 18.

A coin pocket forming panel 41 is integrally joined with the panel 32 along the fold line 42, Figure 4, and the panel 41 is of a similar length to the panels 32 and 33, although offset upwardly somewhat with respect thereto, as shown in the drawings. The coin pocket forming panel 41 comprises a first or upper generally rectangular section 43 adjacent to the fold line 42, and a second generally rectangular section 44, free from attachment to the panel 32, due to the previous tearing along the tear line 12. The panel section 44 is foldable upon the panel section 43 on the fold line 45, transversely of the panel 41. The outer end of the panel section 43 is formed to provide a tapered extension 46, integral therewith, carrying a rounded tab 47, as indicated. The extension 46 is of the same shape or configuration as the tapered coin cup 31, and is insertable therein, as will be further described. The extension 46 is arranged in lateral alignment with the coin cup 31 in Figure 4. The outer end of the panel section 44 carries a curved flap 49, integral therewith, and foldable upon the fold line 50. The flap 49 terminates a short distance inwardly of the straight edge 36 of central panel 32, as shown.

The numeral 51 designates generally a substantially L-shaped partition forming portion of the billfolder body portion 11. The partition forming portion 51 comprises an inner relatively short panel 52, integrally joined to the panel 33 at one side of the same along a fold line 53, parallel to the fold lines 42 and 34, and in alignment with the fold line 40. The ends of the panel 52 are cut back to form curved edges 54 and 55, and the curved edge 54 is disposed inwardly of the adjacent tongue 39. The curved edge 55 is located near the longitudinal center of the panel 33. The partition forming portion 51 further embodies an elongated generally rectangular panel 56, integrally joined to the panel 52 along a further fold line 57, parallel to the fold line 53 and extending for the length of the panel 52. The panel 56 is approximately twice as long as the panel 52, and includes in its lower portion, Figure 4, a rectangular transparent window 58, formed by the previously described welding of the transparent blank 8 beneath the opening 2 of the original blank 1. The portion of the panel 56 having the transparent window 58 lies opposite to and spaced from the lower portion of the central panel 33.

The end of the elongated panel 56 remote from the transparent window 58 carries an integral reduced rectangular extension 59, as shown. A narrow strip 60, adapted to form a stop element in the finished billfolder, is integrally secured to the central panel 33 along a fold line 61, in substantial alignment with the fold line 53. The stop forming strip 60 is also integral with the panels 52 and 63 as shown in Figure 4. The inner side of the panel 56 is notched at 62 for a purpose to be described.

A generally rectangular pocket forming panel 63 is integrally joined with the lower portion of the panel 33 along a fold line 64, also aligned with the fold lines 53 and 61. In Figure 4, the panel 63 is arranged in side by side relation with the lower portion of the panel 56 but free from attachment thereto due to the previous tearing of the blanks along the tear line 13. The pocket forming panel 63 has a rectangular transparent window 65, formed by the previously described welding of the transparent blank 8 to the blank 1, beneath the rectangular opening 3. The lower or outer end of the pocket forming panel 63 is circularly curved at 66, reversely to the curvature of the edge 35. The curved edge 66 extends somewhat beyond the corresponding ends of the panels 32, 33 and 56 as shown in Figure 4. The panel 63 is spaced from the panel 52 a distance equal to the length of the strip 60. The panel 63 is also free from attachment to the panel 52, as shown.

With continued reference to Figure 4, and before proceeding with the description of the formation of the finished billfolder, it is desired to point out that the various marginal edges of the billfolder body portion 11 in Figure 4 designated by double lines, such as the edge 66, edge 54 and the margin of the notch 62, are beaded edges formed by the welding die means to resist tearing at these points.

Figures 5, 6:
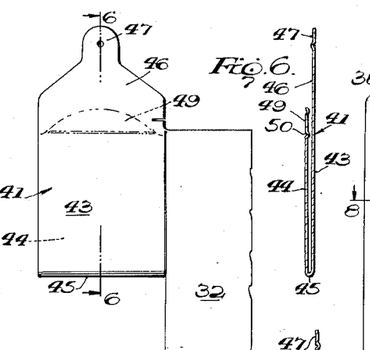
Figure 5 is a fragmentary plan view of the billfolder body portion illustrating a first folding operation performed upon the same.
Figure 6 is a vertical section taken on line 6—6 of Figure 5.

Reference is now made to Figure 5, and also to Figure 6, showing the next folding operation in the construction of the billfolder. In these figures, the panel section 44 is merely folded upwardly and beneath the panel section 43 of the coin pocket forming panel 41. The folding of the panel section 44 beneath the panel section 43 is on the fold line 45 of Figure 4. Continuing to Figures 7 and 8 of the drawings, the entire body portion 11 of Figure 4 is now folded upon the fold line 34, so that the previously folded coin pocket forming panel 41 underlies the panel 52. Also, the panel 32 is now underlying the central panel 33. The integral tongue 38 is folded beneath the panel 33 along with the panel 32 carrying it. The tongue 39 is arranged beneath the tapered extension 46, and the slits 18 and 19 are interengaged, as shown. The other parts of the billfolder body portion in Figure 7 remain disposed exactly as shown in Figure 4.

Figure 7:
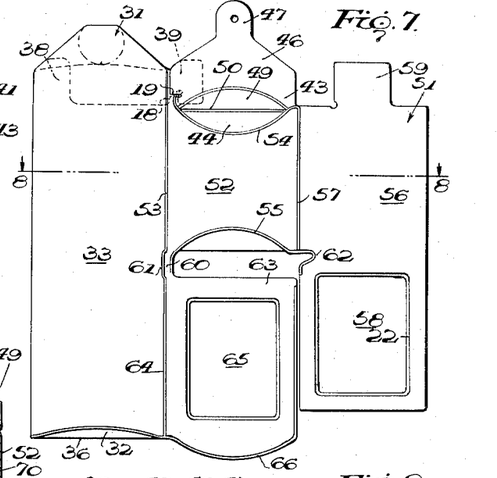
Figure 7 is a further plan view of the billfolder body portion after a further folding of the same.
Figures 8, 9, 10, 11, 12:
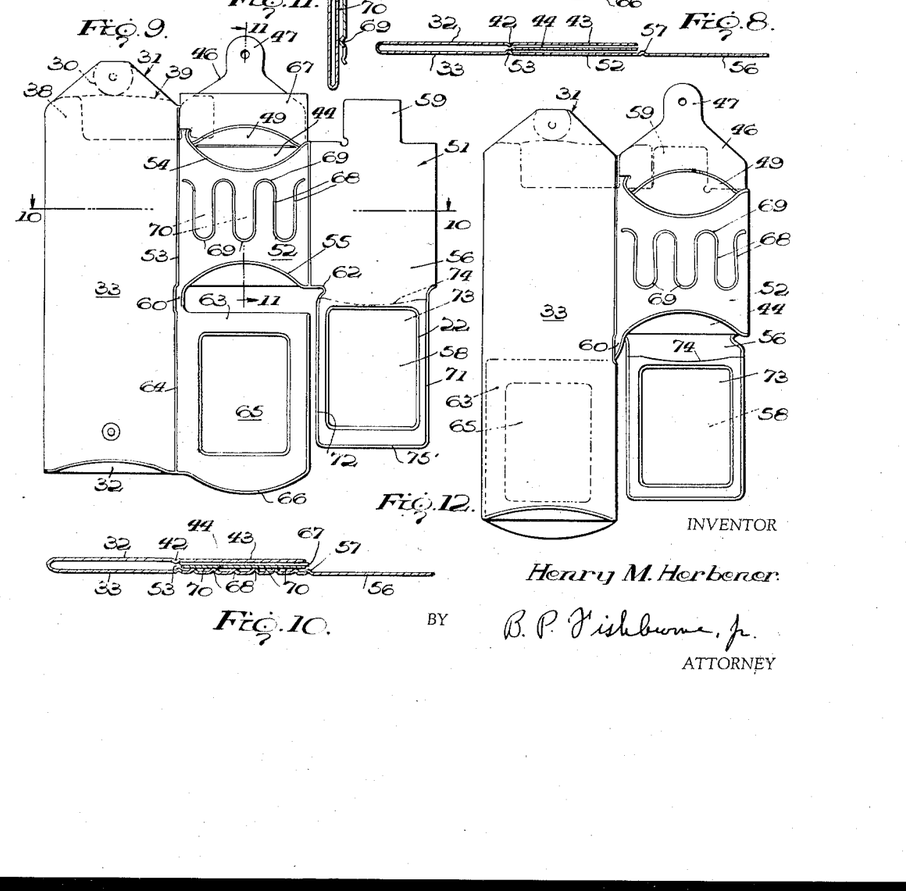
Figure 8 is a horizontal section taken on line 8—8 of Figure 7.
Figure 9 is a further plan view similar to Figure 7 showing an additional welding operation.
Figure 10 is a horizontal section taken on line 10—10 of Figure 9.
Figure 11 is a vertical section taken on line 11—11 of Figure 9.
Figure 12 is a further plan view of the billfolder body portion showing further folding and welding operations.

With continued reference to Figure 7 and also to Figures 9 and 10, the next welding operations in the formation of the billfolder are shown. In Figures 9 and 10, a metal plate 67 is temporarily inserted between the panel sections 43 and 44, as shown. The welding die means is now operated to weld together the panel section 44 and the overlying panel 52, along spaced parallel lines of welding 68 of equal length, and connected at their ends by U-shaped lines of welding 69. The lines of welding 68 and 69 form in effect a continuous zigzag line of welding connecting the panel section 44 with the panel 52, between the curved cut back edges 54 and 55 of the panel 52. The lines of welding 68 and 69, while serving to permanently connect the panel section 44 with the panel 52, also serve to form between these elements a plurality of oppositely opening pockets 70, Figure 17, for the reception of keys. The shank portions of the keys within the pockets 70 extend between the parallel lines of welding 68, and the heads of the keys will underlie the panel 52. After the completion of the above-described welding operation, the metal plate 67 is withdrawn from between the panel sections 44 and 43, and as previously stated, the purpose of the plate 67 is to prevent the welding of the panel section 44 to the section 43.

Figure 13:
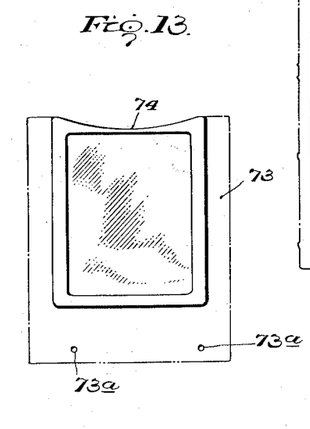
Figure 13 is a plan view of a transparent panel utilized in the welding operation of Figure 9.

Referring to Figure 13, there is shown a generally rectangular section 73 of transparent sheet plastics material of the same type employed in the remainder of the billfolder. One end of the section 73 is cut back somewhat on a curved line 74, as indicated. Referring again to Figure 9, the transparent section 73 of Figure 13 is applied to the underside of the panel 56, adjacent the transparent window 58. Locator holes 73a are provided in the oversize transparent section 73 to position the same within the die means. The welding die means, not shown, is now operated to trim and reduce the width of the lower portion of panel 56 having the transparent window 58, and simultaneously, the transparent section 73 is welded to the panel 56 along lines of welding 71, 72 and 75' in Figure 9. This operation also trims or reduces the transparent section 73 to the size shown in Figure 9, and inspection of Figures 7 and 9 shows that the lower portion of the panel 56, together with the underlying transparent section 73 has now been reduced in width upon both longitudinal sides, compared to the original width of the panel 56 in Figures 4 and 7. The transparent section 73 is not welded to the panel 56 along its upper curved edge 74 in Figure 9 and such edge remains free of attachment to the panel 56 to provide a downwardly longitudinally opening pocket upon the panel 56, such pocket being transparent upon both sides thereof. The marginal edges 71, 72 and 75', which are welded edges, are also beaded by the welding operation to eliminate subsequent tearing. The edge 72 is now spaced somewhat from the adjacent pocket forming panel 63 as shown in Figure 9, and the edge 72 leads to the notch 62, and a portion of this notch previously shown in Figures 4 and 7 is now eliminated by the trimming and welding operation just described.

As indicated in Figure 12, the billfolder body portion 11 is further folded by folding the pocket forming panel 63 downwardly and beneath the panel 32. The panel 63, in Figure 12, now underlies both of the panels 32 and 33, as shown. The entire panel 56 in Figure 12 is likewise folded so as to underlie the panel sections 44 and 43, and the panel 56 lies adjacent to the panel section 43. The transparent section 73 and the window 58 now form a transparent pocket extension extending below the key pocket forming panel 52 and the folded panel sections 43 and 44, Figure 12. This extension now lies opposite the folded pocket forming extension 63 and the lower portions of the panels 32 and 33, as shown.

Figures 14, 15, 16, 17, 18, 19, 20, 21, 22, 23, 24:
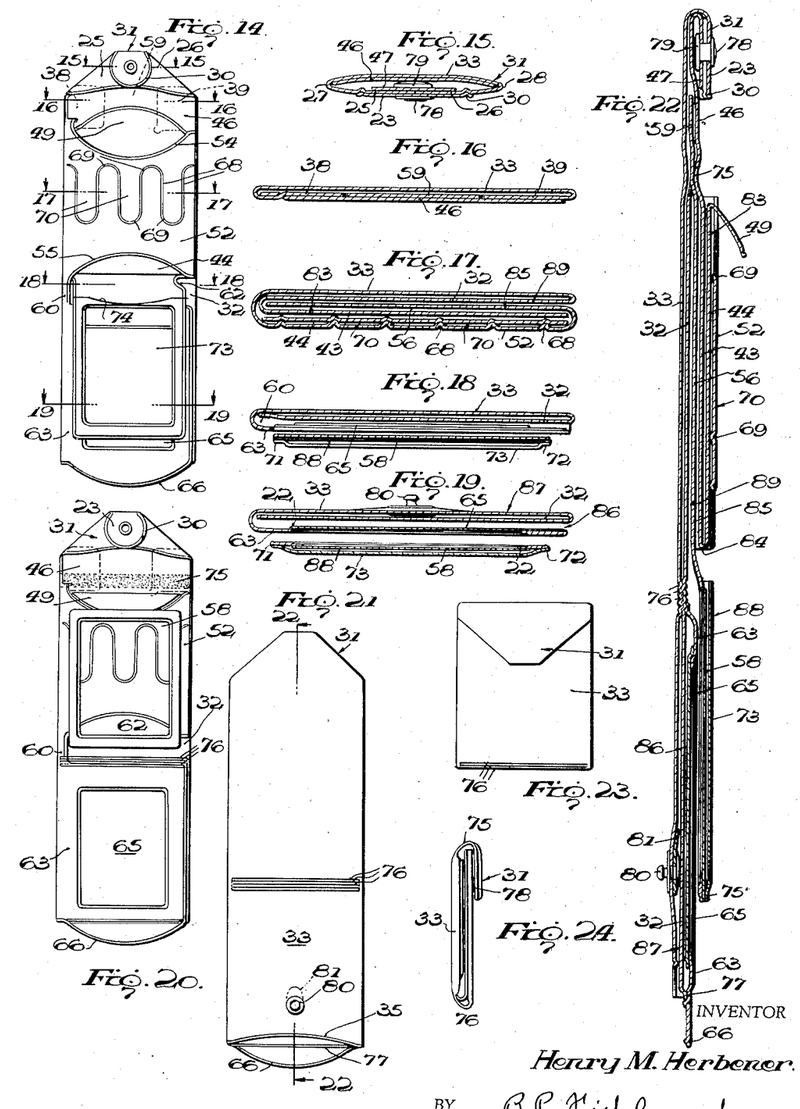
Figure 14 is a further plan view of the billfolder after subsequent and final folding operations.
Figures 15, 16, 17, 18 and 19 are enlarged horizontal transverse cross sections taken on lins 15—15, 16—16, 17—17, 18—18 and 19—19 of Figure 14.
Figure 20 is a further plan view of the billfolder showing the final welding operations performed upon the same.
Figure 21 is a further plan view showing the opposite side of the billfolder illustrated in Figure 20.
Figure 22 is an enlarged central vertical longitudinal section taken on line 22—22 of Figure 21.
Figure 23 is a plan view of the completed billfolder in the closed condition.
Figure 24 is a side elevation of the same.

With reference to Figure 14, the entire right hand section of the billfolder, Figure 12, is now folded under the section of the billfolder embodying the panels 32 and 33 and the pocket forming panel 63, and the billfolder is inverted in Figure 14 from its previous position shown in Figure 12 to more clearly show the constructions. At this same time, the tapered extension 46 and rounded tab 47 are tucked inside of the coin cup 31, and the tab 47 is folded back upon the extension 46 so as to underlie the circular tab 23 and the tabs 25 and 26. When the billfolder is arranged as shown in Figure 14, the narrow strip 60 overlies one marginal edge of the panel 32 near the longitudinal center of the billfolder, and the strip 60 forms with the panels 63 and 52, with which it is integrally joined, a continuous and uninterrupted folded edge along the entire length of the billfolder at its left hand side in Figure 14. The previously folded tongue 38 which is integral with the panel 52 also constitutes a part of this longitudinal folded edge along the entire length of the billfolder. The opposite longitudinal edge of the billfolder body portion is also a folded edge throughout the entire length of the billfolder, due to the previously-described folded relationship of the panels 32 and 33. These longitudinal folded edges and the manner of producing them constitute an important feature of the invention in that the plastic billfolder body portion is entirely free of raw or cut edges likely to tear. The construction provided forms a high quality billfolder which is extremely durable and attractive in appearance and yet fully adapted to be constructed entirely of low cost heat sealable plastics material.

As shown in Figure 20, the transparent pocket extension including the window 58 and section 73 is now temporarily folded upwardly so as to overlie the panel 52. The curved flap 49 is folded downwardly toward the panel 52 and held out of the way during the subsequent welding operation. The welding die means is now operated to form a continuous area or strip 75 of welding across the full width of the panel 43 and extension 46, directly above the upper ends of panels 52, 44 and 32. During the formation of the area of welding 75, a metal plate, not shown, is introduced longitudinally between the panels 32 and 33, so that the area of welding 75 will not go through the panel 33 or weld the other elements of the billfolder thereto. The area 75 of welding permanently welds together the upper portion of the panel 43 adjacent to extension 46 and the tongues 38 and 39 and the intermediate tab 59 which lies between these tongues. The area of welding 75 also seals or welds the small tongue 39a, Figure 4, in interlocking relation with the slit 19, previously described. After completing the welded area 75, the metal plate is removed from between the panels 32 and 33 and the welded area does not show on the outer face of the panel 33, which is the underside of the billfolder in Figure 20. In addition to permanently securing the previously-named elements of the billfolder together in assembled relationship, the area of welding 75 forms a hinge or readily bendable section across the billfolder to facilitate folding of the coin cup 31 when the billfolder is closed.

With the billfolder still arranged as in Figure 20, the welding die means also operates upon the billfolder to produce several closely adjacent lines of welding 76 transversely thereof near the longitudinal center of the billfolder. These lines of welding 76 permanently weld together the panels 32 and 33 and the upper edge of the pocket forming panel 63. The lines of welding 76 also cross the lower portion of the narrow strip 60, Figure 20, and permanently weld such portion to the panel 32, just above the upper edge of the panel 63. The remainder of the strip 60 is free from attachment to the panel 32 and serves as a stop for the paper money or bills which are subsequently introduced within the bill compartment 89, so that the inner longitudinal edges of the bills will not become tightly jammed within the fold between the billfolder body portion and the partition of the billfolder at the left hand side of the billfolder, Figure 20. The lines of welding 76 also constitute a hinge transversely of the billfolder to facilitate bending or folding of the same during use.

With reference to Figure 21, the billfolder is now inverted and the welding die means again operate upon the same to form a transverse line of welding 77, which permanently secures together the lower edge portion of the panel 32 and the pocket forming panel 63, adjacent to the inner end of the flap 66. The panel 33 is not welded by the welding line 77 to the panel 32, or to the pocket forming panel 63, and the cut back edge 35 of the panel 33 is clear of the welding line 77, as shown in Figure 21. This now completes the folding and welding operations upon the billfolder, and the same is now in a substantially complete or finished state.

A female snap fastener element 78, Figure 22, is applied through the tabs 23, 25 and 26 and also through the tab 47, which lies inwardly of the tabs 25 and 26. The female snap fastener element 78 includes a button 79 at its inner end, arranged inwardly of the tab 47, for mechanically securing such tab to the coin cup tabs 23, 25 and 26. The snap fastener element 78 may be applied to the billfolder after the completion of the welding and folding operations above-described, or at any preferred time subsequent to the welding together of the tabs 23, 25 and 26 by the line of welding 30. A coacting male snap fastener element 89 is applied to the outer side of the panel 33, near its lower end and at its transverse center. An oblong reinforcing element or tongue 81 is secured under the snap fastener element 80, next to the inner side of the panel 33. The purpose of the tongue 81 is to strengthen the panel 33 and prevent its tearing when the snap fastener elements 78 and 80 are separated for opening the billfolder. The reinforcing tongue 81 is preferably welded to the inner face of the panel 33 by a circular line of welding 82 while the billfolder is in the blank state shown in Figure 3. The elongated portion of the tongue 81 shown above the snap fastener element 80 in Figures 21 and 22 may be free of attachment to the panel 33, and it is merely necessary to weld the tongue 81 to the panel 33 by the circular line of welding 82, as stated.

In Figures 21 and 22, the now completed billfolder is shown in the extended or open condition. Figures 23 and 24 show the billfolder in the closed condition, wherein the male and female snap fastener elements 80 and 78 have been brought into interlocking engagement. To close the billfolder, the same is merely folded in the manner shown on the welding area 75 and welding lines 76. The coin cup 31 is disposed outwardly of the panel 33, and the billfolder assumes the shape shown in Figures 23 and 24. The transparent pocket extension of the panel 56, including the window 58 and transparent section 73 is folded along with the lower half of the billfolder in Figure 21, so as to overlie the panel 52 when the billfolder is closed.

It may now be clearly seen that the billfolder embodies a number of pockets or compartments, all having a useful purpose. A longitudinal coin holding pocket 83 is formed between the panel sections 43 and 44, as clearly shown in Figure 22, and the top or outer end of the coin pocket 83 is open, whereas its inner end is closed at 84 by the folded relation of the panel sections 43 and 44. The sides of the coin pocket 83 are also completely closed by the previously described folding of the billfolder. The oppositely longitudinally opening key pockets 70, previously described, are arranged outwardly of the coin pocket 83 and are formed by or between the panel section 44 and the short panel 52. It is thus seen that the panel section 44 serves as one wall of the coin pocket 83, and also as one wall of the several key pockets 70.

An inwardly longitudinally opening secret pocket 85 is also formed between the panel section 43 and the upper portion of the panel 56. This secret pocket 85 has its outer end closed by the area of welding 75. The sides of the secret pocket 85 are closed by the previously described folding of the billfolder.

An additional side opening pocket 86 is formed between the panel 63 and the lower half of the elongated panel 32, and the opposite ends of this pocket 86 are closed by the lines of welding 76 and 77. A further longitudinally opening pocket 87 is formed between the lower portions of the panels 32 and 33, and the inner end of this pocket is permanently closed by the lines of welding 76. Its sides are closed by the folding of the panels 32 and 33 upon each other, as previously described.

A further longitudinally inwardly opening transparent pocket extension 88 is formed between the section 73 and the lower half of the panel 56, as previously explained.

The flap 49 of panel section 44 serves to cover or close the ends of the upwardly opening key pockets 70, so that the keys will not slide out of these pockets, and the free extension constituting the pocket extension 88, when folded, serves as the closure flap for the downwardly opening key pockets 70, so that the keys cannot slide out of the same when the billfolder is closed. The flap 66 likewise serves to cover or close the outer open end of the pocket 87 when the billfolder is closed.

A main compartment 89 for bills is formed between the panel 56 and the panel 32. The bill compartment 89 has its upper end closed by the area of welding 75, but is entirely open at one side of the billfolder and closed at the other side thereof by the described folding of the billfolder. The bills are also introduced between the elements forming the transparent pocket extension 88 and the pocket forming panel 63 having the transparent window 65. The bill or paper money compartment 89 extends for the entire length of the panel 56 and is open at its lower end where the transparent pocket extension afforded by the section 73 and the lower part of panel 56 are free from connection with the other elements of the billfolder. The bill compartment 89 is closed only at its upper end by the area of welding 75, and at one side thereof as shown in Figure 19, due to the folding of the billfolder at such side. The compartment 89 is closed at one side of the billfolder only throughout the length of the panel 52 and associated elements, which extend for approximately one-half the length of the billfolder.

The coin cup 31 is disposed at the open end of the coin pocket 83, as shown clearly in Figure 22. When the billfolder is in the open or extended position, the tapered extension 46 forms a smooth sliding surface from the mouth of the coin pocket 83 into the coin cup 31. In order to cause the coins to slide from the pocket 83 into the coin cup 31, it is merely necessary to open the billfolder and lower the coin cup 31 somewhat, while at the same time squeezing together the sides of the billfolder near its upper end. This causes the coin cup 31 to open, and the coins will readily slide from the pocket 83 downwardly and into the coin cup, where they may be readily grasped with the fingers. Likewise, by merely elevating the coin cup above the horizontal, and continuing to squeeze the sides of the billfolder, the coins will readily slide back into the coin pocket 83 which is held open by the pressure upon the sides of the billfolder. This mode of operation or use of the coin cup 31, in conjunction with the coin pocket 83, is also described in my prior Patents 2,277,104 and 2,346,433.

In connection with dispensing of bills or paper money from the billfolder, a feature of the construction is that the bills may be removed from the billfolder while it is in the closed condition, Figures 23 and 24, and without separation of the snap fastener composed of the elements 78 and 80. In order to remove a bill from the billfolder, while the same is closed, it is merely necessary to grasp one corner of the bill between the fingers and the bill may be readily withdrawn sidewise from the open side of the bill compartment 89. The bills within the closed billfolder are doubled or folded about a partition composed of the transparent pocket extension 88, on one side, and the upper portion of the panel 56 on the other side of the partition. The remainder of the partition in the folded billfolder consists of the panels 52 and the panel sections 43 and 44. The mentioned partition in the folded billfolder lies between the pocket forming panel 63 and the upper portion of the panel 33.

The billfolder possesses a number of other advantageous features. For example, the side wall of the coin pocket 31 is made up of two thicknesses of material, constituted by the tapered extension 46 on the inner side, and the upper tapered portion of the panel 33. Additionally, the side wall of the coin cup 31 is reinforced by the extension 59 and the tongues 38 and 39, which elements lie between the tapered extension 46 and the panel 33 in the finished billfolder. The extension 59 is not secured to the folded over tongues 38 and 39, and these elements are freely disposed in between the extension 46 and the panel 33. This has been found to aid in the opening or cupping of the coin cup 31, when the sides of the billfolder are squeezed as previously described. Additionally, the folding of the tongues 38 and 39 forms folded edges on the sides of the coin cup 31, which are in effect continuations of the longitudinal folded edges of the billfolder body portion, so that no part of the billfolder has any cut or raw edges, likely to tear.

A further important feature of the billfolder construction resides in the fact that all of the marginal edges of the finished billfolder are folded edges, and none of them are cut or raw edges which would be likely to tear. This greatly increases the strength and durability of the billfolder in general. Additionally, the body portion of the billfolder composed of the panels 32 and 33 and also the pocket forming panel 63 is at least two thicknesses of material throughout its length, and three thicknesses adjacent to the panel 63. This also greatly strengthens the billfolder and renders it very durable.

The various other pockets in the billfolder previously described, in addition to the key pockets 70 and coin pocket 83, may be utilized to hold a variety of items, such as cards, papers, driver's license and other similar documents. The transparent pocket extension 88 and the window 65 may be utilized to display identification cards, pictures and the like. In this connection, I wish to state that any desired parts or panels of the billfolder may be made of transparent material, and in like manner, the entire billfolder may be formed of opaque plastic material, if preferred.

The purpose of the notch 62 in the finished billfolder is to eliminate any tendency for the bills in the bill compartment 89 from catching or hanging up on the folded partition composed of the pocket extension 88 and the upper portion of the panel 56 when the billfolder is in the closed condition. The presence of the notch 62 renders it easier to remove the bills from the compartment 89, without opening the billfolder. Of course, the billfolder may be readily opened by separating the snap fastener for the removal of bills, if preferred.

Figure 25:
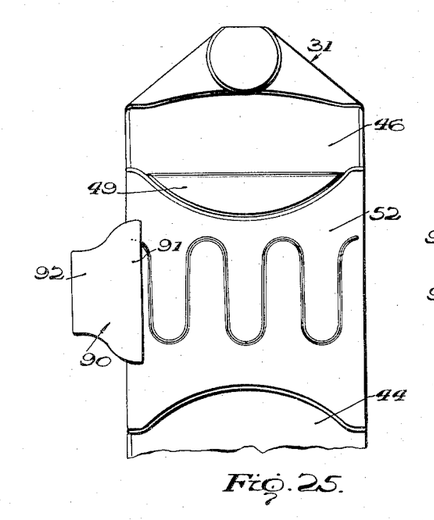
Figure 25 is a fragmentary plan view of a billfolder embodying a slight modification of the invention.
Figures 26, 27, 28:
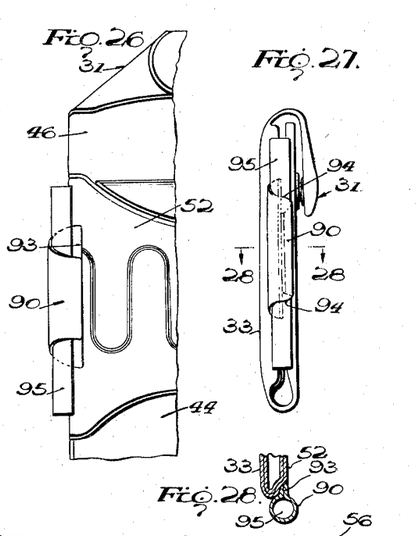
Figure 26 is a further fragmentary plan view of the billfolder showing the completion of the modification.
Figure 27 is a side elevation of a completed billfolder in closed position embodying the modification.
Figure 28 is a fragmentary horizontal section taken on line 28—28 of Figure 27.

In Figures 25 to 28 of the drawings, there is shown a slight modification of the invention, wherein a preferably transparent section 90 of the same heat sealable plastic material employed for the remainder of the billfolder is provided, and shaped in accordance with the showing in Figure 25 before folding. The wider edge portion 91 of the element 90 overlies one longitudinal edge portion of the key pocket panel 52, as shown in Figure 25. The narrower portion 92 of the element 90 is folded over upon the wider portion 91, Figure 26, and the overlapping inner edge portions of the element 90 are now welded by a line of welding 93 to the panel 52 only, care being taken not to weld the panel 52 to the panel section 44 along the line of welding 93. The above operations form the element 90 into a tube or sleeve, as shown in Figure 28, and the opposite ends of this sleeve have a spiral configuration as shown at 94 in Figure 27. This facilitates the introduction into the sleeve 90 of a small lipstick applicator 95, pen, pencil or the like. The length of the element 95 is such that it extends adjacent to one longitudinal edge of the panel 52, and preferably is slightly shorter than the panel 52, lengthwise of the billfolder. The sleeve 90 is positioned to extend slightly outwardly of the adjacent edge of the billfolder as shown in Figure 26, and the presence of the sleeve and element 95 does not interfere in the slightest with the normal use of the billfolder as above-described. The element 95 tends to lie in a space or slot formed between the opposite sides or portion of the billfolder when the latter is in the closed condition, so that the element 95 does not project very much beyond the longitudinal edge of the closed billfolder. All other parts of the billfolder shown in Figures 25 to 28 are identical with those shown and described in connection with the prior form of the invention.

Figure 29:
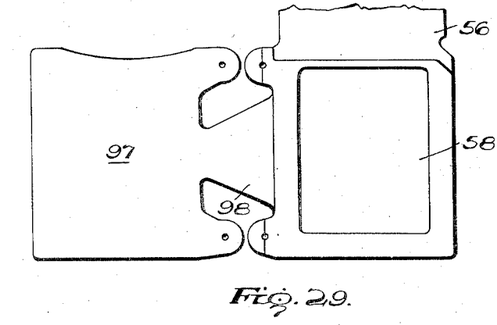
Figure 29 is a fragmentary plan view of a portion of a billfolder embodying a further modification of the invention.
Figure 30:
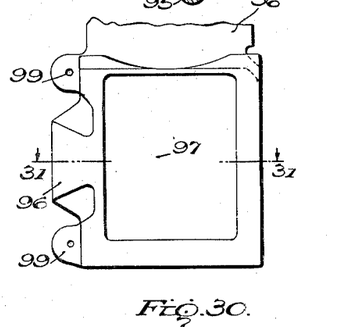
Figure 30 is a further plan view of the portion of the billfolder showing a folding step in the modification.
Figure 31:
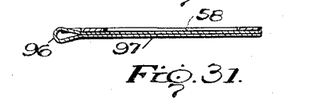
Figure 31 is a horizontal transverse cross section taken on line 31—31 of Figure 30.

In Figures 29 to 32, there is shown a further slight modification, wherein a sleeve or holder 96 for a lip rouge applicator or the like is carried by one longitudinal edge of the transparent pocket extension 100, which is otherwise identical to the previously described pocket extension 88. In order to produce the sleeve 96 in Figures 29 to 31, the portion of the original transparent blank 8 underlying the original opening 2 of the blank 1 carries an integral transparent extension 97, shaped as shown in Figure 29 prior to folding. A reduced neck portion 98 of this transparent blank extension is provided, and upon folding of the extension 97 over on top of the panel 56, as shown in Figure 30, the lip rouge holding sleeve 96 is formed, as well as the other side of the transparent pocket extension 88, previously described. In this form of the invention, the transparent section 73 of Figure 13 is not needed and is omitted, since the transparent extension 97 takes its place.

Figure 32:
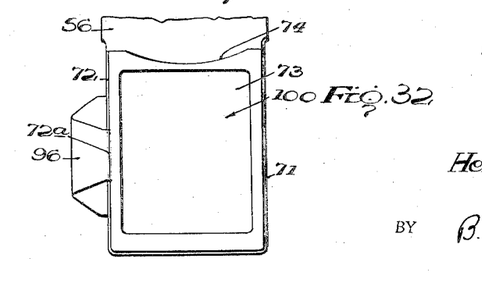
Figure 32 is a plan view of the completed pocket extension after welding with the sleeve for the lip rouge applicator on one side of the same.

The subsequent welding of the transparent blank to the panel 56 produces the pocket extension 100, and the previously described welding and trimming operation upon the pocket extension at the lines 71 and 72 eliminates entirely the blank locating tabs 99, which have no function, other than to hold or locate the transparent blank during welding of the same to the panel 56. In the finished state, the transparent pocket extension 100, Figure 32, is formed, with the sleeve 96 at one side of the same for holding the lip rouge applicator. When the pocket extension 100 is welded and trimmed along line 72, the upper narrow side of the sleeve 96, Figure 32, is also welded to the rear side 96a of the sleeve and to pocket extension 100 along a line of welding 72a. All other parts of the billfolder are identical with the corresponding parts shown and described in connection with the first form of the invention. The modifications shown by Figures 25 through 32 are entirely optional, and may be omitted from the billfolder if preferred.

In Figures 32a through 36, there is shown a further modification, wherein an additional side opening pocket is formed upon the pocket extension 88, at the same time that the lip rouge applicator sleeve and the previously described transparent pocket afforded by the panels or windows 58 and 73 are formed. In this modification, a further advantage is achieved, in that a folded edge is provided instead of the previously described edge 74 on the pocket extension 88.

In Figures 32a to 36, a generally L-shaped transparent blank 101 is provided, in conjunction with the previously described panel 56. In the procedure now to be described, the L-shaped blank 101 together with the panel 56 makes up the same transparent pocket extension 100 shown in Figure 32, with the sleeve 96, plus one additional side opening pocket in superposed relation with the longitudinal pocket already afforded by the pocket extension 100 and the corresponding pocket extension 88 in the first form of the invention.

Figures 32A, 33, 34, 35, 36, 37:
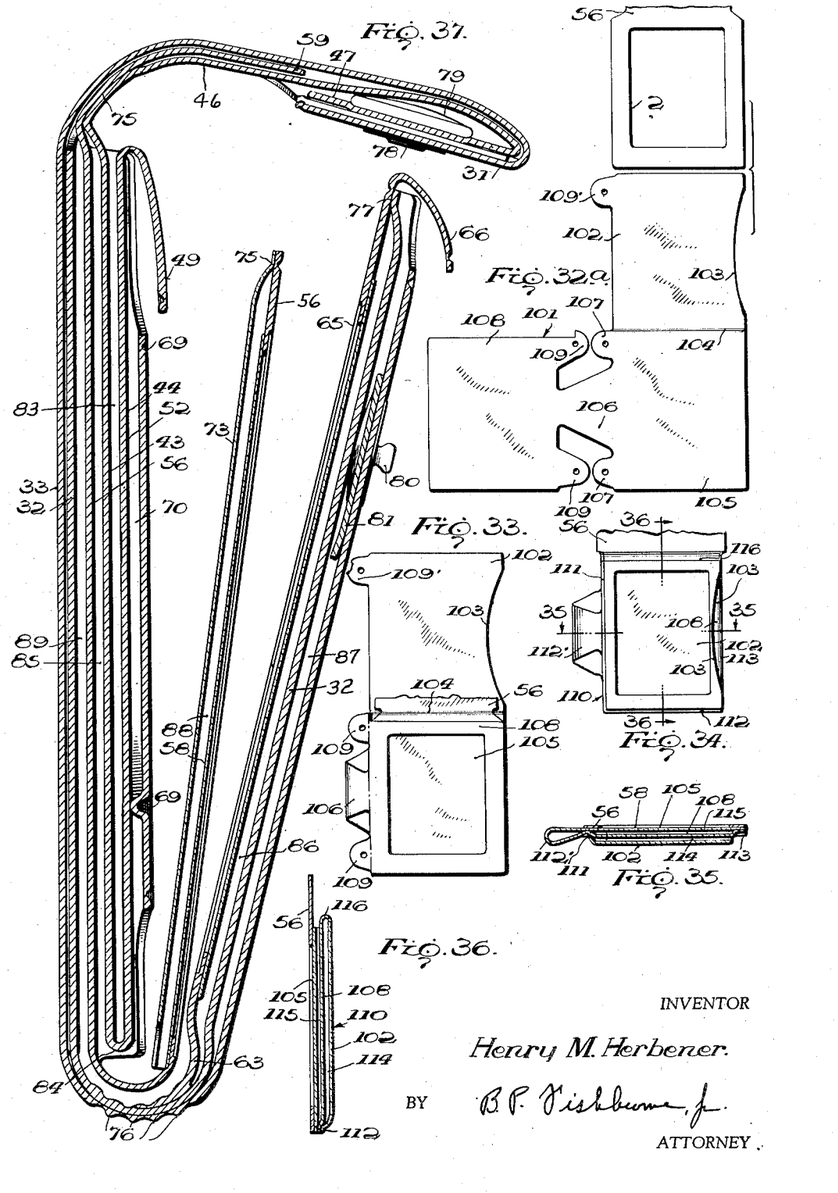
Figure 32a is a composite plan view of a portion of the billfolder and a transparent blank in accordance with a further modification.
Figure 33 is a plan view of the billfolder portion and said blank showing a folding step in making the modification.
Figure 34 is a further plan view of the modification after completion of the welding and trimming operations.
Figure 35 is a horizontal section taken on line 35—35 of Figure 34.
Figure 36 is a vertical section taken on line 36—36 of Figure 34.
Figure 37 is a greatly enlarged central vertical section through the billfolder according to Figure 22 and with the billfolder in a folded and partly closed condition and illustrating the positions of the various billfolder pockets and elements.

More specifically, the transparent plastic blank 101 comprises a longitudinal generally rectangular pocket forming panel 102, having a cut back curved longitudinal edge 103. Integrally secured to the panel 102 along a transverse fold line 104 is a generally rectangular panel 105, having a reduced tapered extension 106 formed integral therewith at one side of the same. The panel 105 is also provided with apertured die locator tabs 107, on opposite sides of the extension 106. The end of the extension 106 carries a rectangular panel 108 integral therewith, and provided at its side adjacent to the panel 105 with apertured die locator tabs 109, as shown.

With continued reference to Figures 32a through 36, the panel 105 corresponds to the part of the transparent blank 8 in the first preferred form of the invention which forms the transparent window 58 upon the lower part of panel 56. As in the last-described modification, the transparent blank 73 of Figure 13 is not used. In Figure 33, the panel 56 is shown with the transparent window made from the panel 105 thereon, corresponding to the construction shown in Figure 7. That is to say, the welding around the welding line 22 in Figure 7 is completed. The panel 108, Figure 33, is now folded over upon panel 105, and the locator tabs 109 are superposed upon the tabs 107 so that the work may be accurately located in the die apparatus. The panel 102 is now folded downwardly on line 104 and lies upon panel 108, and the apertured locator tab 109' of panel 102 will register with and lie upon the lowermost pair of tabs 109 and 107.

The welding die apparatus is now operated to weld and trim the transparent pocket extension 110 shown in Figure 34. When this occurs, the transparent panel 105, 108 and 102 are welded together with the panel 56 along a longitudinal line of welding 111 on one side of the pocket extension 110, and also along a transverse line of welding 112 at the bottom of pocket extension 110. A further longitudinal line of welding 113 welds the panels 105, 108 and 102 to the other longitudinal edge portion of the underlying panel 56, but the cut back edge 103 of panel 102 is not welded by the line of welding 113 and remains free of attachment to the panel 108 to form a side opening pocket 114 between panels 102 and 108 in the pocket extension 110.

A longitudinal pocket 115 corresponding to the previously described longitudinal pockets in the pocket extensions 100 and 88 is now also formed between the panels 105 and 108. The line of welding 111 also completes the formation of the lip rouge applicator holding sleeve 112' as shown in Figures 34 and 35.

The described welding on the lines 111, 112 and 113 also trims and reduces the width of pocket extension 110, including the panel 56 in the same manner described in connection with the lines of welding 71 and 72 in Figure 9 and also in Figure 32.

It is thus seen in connection with Figures 34 through 36 that the pocket extension 110 carries a transparent lip rouge applicator holding sleeve 112', and the pocket extension 110 has a longitudinally opening pocket 115 between transparent window 58 or panel 105 and the intermediate transparent panel 108. The top edge 116 of this longitudinal pocket is a folded edge formed by the folding of panel 102 over panel 108 on the folding line 104, as previously described. This is an advantage over the construction in the prior forms of the invention where the transparent pocket edge 74 was not formed as a folded edge. The pocket extension 110 formed as above described also contains an extra transparent side opening pocket 114, as described, and the top end of this pocket is closed by the folded edge 116 and its bottom end is closed by the line of welding 112 and its inner side is closed by the line of welding 111. The longitudinal pocket 115 has its opposite sides closed by the lines of welding 112. Its opposite end adjacent to the folded welding 111 and 113 and its bottom is closed by the line of edge 116 is open, as clearly shown in Figure 36. One side of the pocket 114 is likewise open adjacent to the cut back edge 103, as shown in Figure 34.

In Figure 37, there is shown a very exaggerated enlarged cross sectional view of the first preferred form of billfolder as illustrated in Figure 22, and showing the billfolder in a partly folded or closed condition and illustrating clearly all of the pockets and panels as well as the other elements of the billfolder previously described.

It is to be understood that the forms of the invention herewith shown and described are to be taken as preferred examples of the same, and that various changes in the shape, size and arrangement of parts may be resorted to, without departing from the spirit of the invention or the scope of the subjoined claims.

Having thus described my invention, I claim:

1. A billfolder formed of weldable sheet plastics material comprising an elongated body portion having two thicknesses of the plastics material throughout its length and having longitudinal folded edges, a pocket forming panel welded to one thickness of said body portion to form therewith a side opening pocket between said panel and one thickness of the body portion, one end of said body portion being open to form an end opening pocket between the two thicknesses of said body portion, means forming a coin cup upon the other end of said body portion and constituting an extension of the body portion and being inwardly open relative to the body portion, a partition hinged to one side of the body portion throughout substantially one-half the length of the body portion, said partition having means forming an end opening coin pocket opposed to the coin cup so that coins may slide from the coin pocket into the coin cup and vice-versa, said partition having means forming a plurality of end opening key pockets therein, said partition having means forming an end opening secret pocket opening in a direction opposite to the opening of the coin pocket, means forming a pocket extension carried by said partition at its end remote from the coin cup and having an end opening pocket arranged opposite the open end of the secret pocket, said pocket extension disposed adjacent to the pocket forming panel and foldable therewith into overlying relation with said partition when the billfolder is closed, and snap fastener means carried by the coin cup and by the end portion of said body portion remote from the coin cup for securing the billfolder in folded closed position.

2. A blank for use in constructing a billfolder comprising first and second connected side by side elongated panels, a third panel carried by the outer edge of said second panel and extending for substantially one-half of the length of the second panel, a pocket forming extension secured to one end of the third panel and free from attachment to the second panel and disposed adjacent to the portion of the second panel remote from the third panel, a pocket forming panel carried by the outer edge of the first panel and extending for approximately one-half of the length of the first panel near the end of the first panel remote from the third panel, a generally L-shaped partition forming portion carried by the outer edge of the first panel and including a part arranged near the inner end of the pocket forming panel and spaced therefrom and an elongated part parallel to the first and second panels and arranged laterally outwardly of the pocket forming panel, coin cup forming extensions carried by one end of the first panel, and a coin cup lining extension carried by the corresponding end of the third panel.

3. A billfolder formed of weldable sheet plastics material comprising an elongated body portion formed of two thicknesses of the plastics material and having a first folded longitudinal edge extending for the entire length of said body portion, said two thicknesses of material of the body portion being unattached at one end of the body portion to form a longitudinal pocket in the body portion, a pocket forming panel arranged in superposed relation with the inner side of the body portion and disposed adjacent said pocket and substantially coextensive therewith and covering approximately one-half of the body portion for forming therewith a side opening pocket, said pocket forming panel being integral with the outer thickness of material of the body portion and being folded upon the inner thickness of material of the body portion to provide a folded longitudinal edge on the billfolder opposite from the first-named folded edge, a first line of welding attaching the first and second thicknesses of the body portion and the pocket forming panel adjacent the inner end of the latter and near the longitudinal center of the billfolder and serving to close the inner end of the first-named pocket and one side of the side opening pocket, a second line of welding attaching the opposite end of the pocket forming panel to the inner thickness of material of the body portion and serving to close the other side of the side opening pocket, a partition for the billfolder arranged in superposed relation with the elongated body portion and having walls formed integral with said two thicknesses of material of the body portion to form another longitudinal folded edge upon the body portion at its side opposite the first-named folded edge and extending for approximately one-half the length of the body portion and spaced from the folded edge formed by the pocket forming panel, said partition including an additional pair of walls arranged in superposed relation with the first-mentioned walls, lines of welding attaching one pair of walls of the partition to form therebetween oppositely longitudinally opening key pockets, another pair of the walls of the partition defining a longitudinal secret pocket in the partition extending for about one-half of the length of the body portion near its end remote from the first-named and side opening pocket, a longitudinal pocket forming extension carried by one wall of the partition and arranged substantially in superposed relation with the side opening pocket, the pocket of the pocket forming extension extending longitudinally of the billfolder and having its inner end open adjacent to the mouth of said secret pocket, one pair of walls of said partition forming a longitudinally opening coin pocket in the partition substantially coextensive with the secret pocket and opening near one end of said body portion, a coin cup carried by the end of the billfolder adjacent to the mouth of the coin pocket and having a wall formed by extensions of one of said two thicknesses of the body portion and one wall of said partition, and a line of welding attaching said extensions near and outwardly of the mouth of the coin pocket and serving to close one end of the secret pocket and also securing the outer end of said partition to the corresponding end of the body portion, the other end of the partition and one side edge thereof being free from attachment to the body portion so that bills may be readily placed between the partition and body portion and withdrawn therefrom, the body portion being foldable transversely upon the second-named line of welding, said pocket forming extension of the partition also being foldable upon the partition when the body portion is folded, and fastener means carried by one of the body portion and by said coin cup for securing the billfolder in closed position when the body portion is folded, the coin cup also being foldable upon the last-named line of welding.

4. A billfolder formed of heat sealable sheet plastics material comprising an elongated body portion including inner and outer thicknesses of material and having a first longitudinal folded edge formed by the folding of said inner and outer thicknesses into superposed relation, said inner and outer thicknesses of material being unattached at one end of the body portion to form a longitudinal pocket in the body portion, a pocket forming panel formed integral with the outer thickness of material of the body portion and arranged in superposed relation with the inner thickness and extending for about one-half of the length of the body portion and forming upon the body portion a second longitudinal folded edge produced by the folding of the pocket forming panel into superposed relation with said inner thickness of the body portion, lines of welding extending transversely of the body portion near its longitudinal center and securing together said inner and outer thicknesses of material and the inner transverse edge of the pocket forming panel and serving to close the inner end of said longitudinal pocket, one side of the pocket forming panel being unattached to said inner thickness of material of the body portion to provide between said inner thickness and pocket forming panel a side opening pocket on the billfolder, a second line of welding transversely of the body portion and securing together said inner thickness of material and the outer end of the pocket forming panel, a partition for the billfolder arranged in superposed relation with the body portion and extending for about one-half the length of the body portion at the end of the body portion remote from the pocket forming panel, said partition including four superposed thicknesses of the sheet plastics material, spaced longitudinal lines of welding securing together the outermost thickness of material of the partition and the next innermost thickness thereof to form a plurality of longitudinally oppositely opening key pockets upon the partition, there being a longitudinally opening secret pocket between the other two thicknesses of the partition and arranged next to said body portion, the mouth of the secret pocket being near the longitudinal center of said body portion, there being a longitudinally opening coin pocket in the partition between the innermost pair of thicknesses thereof, the mouth of the coin pocket being at the end of the partition remote from the mouth of the secret pocket and adjacent to one end of the body portion, a tapered extension carried by the thickness of material of the partition which forms the side wall of the coin pocket closest to the body portion, a tapered extension carried by the outer thickness of said body portion and arranged in superposed relation with the first-named tapered extension, tongue extensions carried by the first and second thicknesses of the body portion and by the thickness of the partition which is next to the body portion and disposed between the first and second-named tapered extensions in superposed relation therewith, a third line of welding transversely of said body portion securing together the first and second-named tapered extensions and the tongue extensions and connecting the outer end of said partition with the body portion at one end of the body potrion, the other end of the partition and one longitudinal side thereof being free of attachment to the body portion, foldable flap means carried by the tapered extension of the outer thickness of the body portion and constituting when folded a coin cup having its inner end open above said first-named tapered extension and opposite to the mouth of the coin pocket, a line of welding securing together the flap means, a pocket forming extension carried by the thickness of the partition next to the body portion and extending longitudinally beyond the end of the partition which is near the longitudinal center of the body portion and arranged adjacent to said pocket forming panel, and snap fastener means carried by said flap means and the remote end of the body portion and serving to secure the billfolder in closed position when said body portion is folded upon the second-named line of welding.

5. A flexible billfolder comprising an elongated body portion having inner and outer panels and a first longitudinal folded edge formed by the folding of said panels upon each other in superposed relation, a pocket forming panel formed integral with said outer panel and extending for approximately one-half of the length of the body portion and forming upon the body portion a second folded longitudinal edge by the folding of the pocket forming panel into superposed relation with said inner panel of the body portion, means for securing the pocket forming panel in superposed relation with said inner panel, a partition for the billfolder integrally secured to the outer panel of the body portion and foldable into superposed relation with the inner panel and forming on the body portion a third folded longitudinal edge extending for substantially one-half the length of the body portion and forming substantially a continuation of the second-named folded edge, means for securing the outer end of the partition to the corresponding end of said body portion, extension means adapted to form a coin cup carried by said outer panel of the body portion and said partition and projecting beyond corresponding ends of the body portion and partition, and a pair of foldable tongues carried by the opposite edges of the extension means of said outer panel and interposed when folded between the same and the extension means of the partition and serving to form folded longitudinal edges upon the opposite sides of the coin cup formed by said extension means, such edges constituting continuations of the folded longitudinal edges of said body portion.

6. A billfolder comprising an elongated body portion having a folded longitudinal edge extending throughout its entire length and a second longitudinal folded edge extending for a portion only of the length of said body portion, a partition carried by the body portion and forming thereon another longitudinal folded edge on the same side of the body portion as the second folded edge and extending for the remainder of the length of such side so that the body portion has substantially continuous longitudinal folded edges on both sides thereof, means forming a coin pocket upon said partition, said coin pocket having an open end adjacent corresponding ends of the partition and body portion, means forming a coin cup upon the end of said body portion adjacent the partition for receiving coins from the coin pocket, and a pair of tongues carried by the opposite longitudinal edges of the coin cup and being folded inwardly to form longitudinal folded edges upon the coin cup which are substantially continuations of the longitudinal folded edges of said body portion.

7. A billfolder comprising an elongated body portion having at least two wall thicknesses throughout its length and having a first longitudinal folded edge on one side thereof and a second longitudinal folded edge on its opposite side extending for about one-half the length of the body portion, a partition carried by the last-named side of said body portion and hinged thereto and forming a third longitudinal folded edge on the body portion at the side thereof having the second folded edge and extending for substantially the remainder of the length of the body portion at such side, an extension carried by one end of the body portion and extending therebeyond and beyond the corresponding end of the partition, a companion extension carried by the adjacent end of the partition and arranged in superposed relation with the first-named extension, a pair of tongues carried by the first-named extension and foldable so as to lie between the extensions beyond the adjacent end of the partition, a plurality of flaps carried by the first-named extension and foldable into overlying relationship with the companion extension, means for securing the flaps together to form a coin cup, means to secure said extensions and tongues together, and means to secure together the wall thicknesses of said body portion at points spaced from the last-named means.

8. A billfolder comprising an elongated body portion having at least two wall thicknesses throughout its length and having first and second longitudinal folded edges, the first folded edge extending for the entire length of the body portion and the second folded edge extending for about one-half of the length of the body portion, a coin cup secured to one end of the body portion and having at least two wall thicknesses and a pair of longitudinal folded edges, a partition carried by the side of the body portion having the second folded edge and hinged thereto longitudinally of the body portion for forming a third longitudinal folded edge on the body portion extending for substantially the remainder of the length of the body portion along its side having the second folded edge, an extension on one end of the partition secured to said coin cup, said partition embodying four wall thicknesses forming pockets between them in the partition, and a pocket extension carried by one wall thickness of the partition and extending over the portion of said body portion remote from the partition.

9. A blank of flexible sheet plastics material adapted to be welded for use in making a billfolder, comprising first and second side by side elongated panels of substantially the same length and being foldable upon each other longitudinally, flaps carried by one end of said first panel and foldable relative to the first panel to form a coin cup upon the finished billfolder, a first tongue carried by one side of said first panel near and inwardly of said flaps and foldable upon the first panel in the finished billfolder, a second tongue carried partly by the other side of the first panel and partly by the second panel at one end of the second panel and foldable upon the first panel in the finished billfolder, a third panel carried by the outer edge of said second elongated panel and extending for approximately one-half the length of said second panel, a tapered extension carried by the third panel at its end nearest said flaps and tongues and projecting beyond the corresponding ends of the first and second elongated panels, a reduced flap carried by the end of said tapered extension and adapted to underlie said flaps in the finished billfolder, a first pocket forming extension carried by the other end of the third panel and free from attachment to the second elongated panel and extending adjacent to the portion of the second elongated panel remote from the third panel and being somewhat shorter than said portion, the first pocket forming extension being foldable upon the third panel transversely thereof, a pocket forming panel carried by the outer edge of the first elongated panel and disposed generally opposite to the first pocket forming extension when the blank is in a flat unfolded position, said pocket forming panel extending for about one-half the length of said first elongated panel near its end remote from the third panel, a second pocket forming extension carried by the outer edge of the first elongated panel and spaced from said pocket forming panel and disposed inwardly of said tongues and extending for approximately one-half the length of the first elongated panel, a third elongated panel carried by the outer longitudinal edge of said second pocket forming extension and having a part extending adjacent to said pocket forming panel when the blank is flat but free from attachment to the pocket forming panel, said third elongated panel being somewhat shorter than the first and second elongated panels, the first, second and third elongated panels, said third panel, pocket forming panel and first and second pocket forming extensions being approximately of the same width, and a reduced flap carried by the end of the third elongated panel which is nearest to said tongues and adapted to lie between said tongues and free from attachment thereto in the finished billfolder.

10. A blank of flexible sheet plastics material in accordance with claim 9, and a short flap carried by the outer edge of the first elongated panel and disposed between said pocket forming panel and second pocket forming extension and foldable onto the first elongated panel in the finished billfolder.

11. A billfolder comprising an elongted flexible body portion adapted to receive bills upon the inner face thereof with the bills extending longitudinally of the body portion and being foldable transversely with the bills at substantially the longitudinal center of the body portion, a partition secured to one longitudinal edge of the body portion and extending for approximately one-half of the length of the body portion in superposed relation therewith and free from attachment to the body portion at the opposite longitudinal edge of the body portion, means for securing the outer end of the partition to the corresponding end of the body portion transversely thereof, the inner end of the partition being free from attachment to the body portion, means forming a flexible coin cup secured to the end of the body portion adjacent to the partition and being foldable transversely of the body portion, interfitting securing means carried by said coin cup and the remote end of said body portion for detachably holding the billfolder in a closed condition with the billfolder body portion folded transversely and the coin cup folded so as to overlap one end portion of said body portion, and a slender article holding sleeve secured to said partition and extending longitudinally thereof near the edge of the partition which is joined to said body portion, said sleeve disposed between the partition and a portion of said body portion when the billfolder is closed.

12. A billfolder comprising an elongated flexible body portion, means forming a flexible coin cup secured to one end of said body portion and being foldable transversely adjacent to such end of the body portion, said body portion being foldable transversely near its longitudinal center, a partition arranged in superposed relation with said body portion and extending for substantially one-half the length of the body portion and having one end secured to the body portion adjacent to the inner end of said coin cup, one longitudinal edge of the partition being secured to the corresponding edge of said body portion, the other longitudinal edge of the partition and the end of the partition remote from the coin cup being free of attachment to the body portion so that bills may be introduced between said partition and body portion lengthwise thereof, a longitudinal pocket extension carried by the inner end of said partition and disposed in superposed relation to the part of the body portion which extends beyond said partition, a slender article holding sleeve carried by one longitudinal edge of said pocket extension and extending longitudinally thereof, and detachable interconnecting means carried by said coin cup and body portion for holding the billfolder in a closed position.

13. A billfolder comprising an elongated body portion in accordance with claim 12, and wherein said sleeve is on the side of said pocket extension nearest the longitudinal edge of the partition which is attached to said body portion.

14. A billfolder comprising an elongated flexible body portion, means forming a flexible coin cup secured to one end of said body portion and being foldable transversely adjacent to such end of the body portion, said body portion being foldable transversely near its longitudinal center, a partition arranged in superposed relation to said body portion and extending for substantially one-half the length of the body portion inwardly of the coin cup and having one end secured to the body portion adjacent to the inner end of the coin cup, one side of said partition being secured to the corresponding side of the body portion, the other side of the partition and the end of the partition remote from the coin cup being free of attachment to the body portion, a longitudinal pocket extension carried by the inner end of the partition and arranged in superposed relation to that part of the body portion which extends longitudinally beyond the partition, said pocket extension including a longitudinally opening pocket and a side opening pocket, a slender article holding sleeve carried by one longitudinal edge of said pocket extension and extending longitudinally of the pocket extension, and detachable interconnecting means carried by said coin cup and body portion for holding the billfolders in the closed condition.

15. A billfolder according to claim 14, and wherein said sleeve is on the side of the pocket extension adjacent the side of the partition which is attached to the body portion.

References Cited in the file of this patent

UNITED STATES PATENTS

| | | |
|---|---|---|
| 2,346,433 | Herbener | Apr. 11, 1944 |
| 2,352,383 | Herbener | June 27, 1944 |
| 2,667,906 | Stiller | Feb. 2, 1954 |